United States Patent
Kusume et al.

(10) Patent No.: US 7,041,344 B2
(45) Date of Patent: May 9, 2006

(54) BIAXIALLY ORIENTED POLYESTER FILM FOR LIGHT-DIFFUSING PLATE AND LIGHT-DIFFUSING PLATE

(75) Inventors: Hiroshi Kusume, Sagamihara (JP); Koji Furuya, Sagamihara (JP)

(73) Assignee: Teijin Limited, Osaka (JP)

( * ) Notice: Subject to any disclaimer, the term of this patent is extended or adjusted under 35 U.S.C. 154(b) by 204 days.

(21) Appl. No.: 10/049,418

(22) PCT Filed: Jun. 7, 2001

(86) PCT No.: PCT/JP01/04806

§ 371 (c)(1),
(2), (4) Date: Feb. 12, 2002

(87) PCT Pub. No.: WO01/96451

PCT Pub. Date: Dec. 20, 2001

(65) Prior Publication Data

US 2002/0146518 A1  Oct. 10, 2002

(30) Foreign Application Priority Data

Jun. 15, 2000   (JP) .................................... 2000-179794

(51) Int. Cl.
*C09K 19/00* (2006.01)
*B32B 27/00* (2006.01)

(52) U.S. Cl. .................... 428/1.1; 428/1.1; 428/1.5; 428/1.54; 428/220; 428/327; 428/325; 428/423.7; 428/480; 428/483; 428/910

(58) Field of Classification Search ............... 428/1.1, 428/1.5, 1.54, 220, 327, 325, 423.7, 480, 428/483, 910
See application file for complete search history.

(56) References Cited

U.S. PATENT DOCUMENTS 5,677,024 A * 10/1997 Abe et al. ................ 428/40.1

FOREIGN PATENT DOCUMENTS

| EP | 0 950 682 A1 | 10/1999 |
| GB | 1 309 965 | 3/1973 |
| JP | 50-84247 A | 7/1975 |
| JP | 50-84247 | 7/1975 |
| JP | 09-221541 A | 8/1997 |
| JP | 9-221541 | 8/1997 |
| JP | 10-239504 A | 9/1998 |
| JP | 10-239504 | 9/1998 |
| JP | 11-130879 | 5/1999 |
| JP | 11-130879 A | 5/1999 |
| JP | 2000-89007 | 3/2000 |
| JP | 2000-089007 A | 3/2000 |
| JP | 2000-344875 | 12/2000 |
| JP | 2000-344875 A | 12/2000 |
| JP | 2000-352607 | 12/2000 |
| JP | 2000-352607 A | 12/2000 |

OTHER PUBLICATIONS

International Search Report.

* cited by examiner

*Primary Examiner*—Harold Pyon
*Assistant Examiner*—Marc Patterson
(74) *Attorney, Agent, or Firm*—Sughrue Mion, PLLC

(57) ABSTRACT

A polyester film which is excellent in uniform light diffusibility, heat-resistant dimensional stability and luminance and suitable as a substrate of a light-diffusing plate of a liquid crystal display device. The film comprises a polyester containing polyethylene-2,6-naphthalene dicarboxylate as a main component and has a heat shrinkage in two directions perpendicular to each other in the surface of the film of not higher than 0.3% when heat-treated at 105° C. for 30 minutes, a dimensional change rate in two directions perpendicular to each other in the surface of the film under a stress of 0.37 MPa within a temperature range of 30 to 150° C. of not higher than 1.0%, a density of not lower than 1.350 g/cm³, a total light transmittance of not lower than 87%, a haze value of lower than 1.5% and a thickness of 50 to 150 μm.

19 Claims, 1 Drawing Sheet

BIAXIALLY ORIENTED POLYESTER FILM FOR LIGHT-DIFFUSING PLATE AND LIGHT-DIFFUSING PLATE

TECHNICAL FIELD

The present invention relates to a biaxially oriented polyester film for a light-diffusing plate and a light-diffusing plate using the biaxially oriented polyester film as a base film. More specifically, the present invention relates to a biaxially oriented polyester film useful as a base film for a light-diffusing plate which exhibits not only excellent dimensional stability against the heat from a light source used in the backlight of a liquid crystal panel when used in, for example, a liquid crystal display, particularly, a 15-inch or larger liquid crystal display as used in a desktop personal computer but also excellent luminance, and to a light-diffusing plate.

BACKGROUND ART

A polyethylene terephthalate film is excellent in mechanical properties, heat resistance and dimensional stability at high temperatures and has heretofore been used as a base film for supporting light-gathering beads for the light-diffusing plate of a liquid crystal display.

In recent years, a further improvement in contrast in liquid crystal display and an increase in the size of a display panel are demanded. Such demands require an increase in the light quantity of a backlight light source which is a light source. However, the increase in the quantity of light makes the temperature of the liquid crystal display during operation higher than before. However, the conventional polyethylene terephthalate substrate has the problem that the quantity of light cannot be increased because the heat resistance of the substrate in the light-diffusing plate is not sufficient. Further, the polyester film for a light-diffusing plate has another problem that it is poor in luminance when it has a poor uniform thickness and contains a large amount of foreign matters.

DISCLOSURE OF THE INVENTION

It is an object of the present invention to provide a biaxially oriented polyester film which is useful as a base film for a light-diffusing plate and free of the above problems and which has excellent heat resistance, very small thickness non-uniformity and excellent transparency.

It is another object of the present invention to provide a biaxially oriented polyester film for a light-diffusing plate which is useful as a base film for a light-diffusing plate which exhibits not only excellent dimensional stability against the heat from a light source used in the backlight of a liquid crystal panel but also excellent luminance when used in a liquid crystal display.

It is still another object of the present invention to provide a light-diffusing plate using the biaxially oriented polyester film of the present invention as a base film.

Other objects and advantages of the present invention will be apparent from the following description.

According to the present invention, firstly, the above objects and advantages of the present invention can be achieved by a biaxially oriented polyester film for a light-diffusing plate, which film comprises:

(1) an aromatic polyester whose main recurring unit is ethylene-2,6-naphthalene dicarboxylate,
and has:

(2) a heat shrinkage in two directions perpendicular to each other in the surface of the film of not higher than 0.3% when heat-treated under no load at 105° C. for 30 minutes,
(3) a dimensional change rate in two directions perpendicular to each other in the surface of the film under a load of 0.37 MPa based on the cross section of the film within a temperature range of 30 to 150° C. of not higher than 1.0%,
(4) a density of not lower than 1.350 g/cm$^3$,
(5) a total light transmittance of not lower than 87%,
(6) a haze value of lower than 1.5%, and
(7) a thickness of 50 to 130 µm.

According to the present invention, secondly, the above objects and advantages of the present invention can be achieved by a light-diffusing plate comprising a biaxially oriented polyester film specified by the following requirements (1) to (7):

(1) comprising an aromatic polyester whose main recurring unit is ethylene-2,6-naphthalene dicarboxylate,
(2) having a heat shrinkage in two directions perpendicular to each other in the surface of the film of not higher than 0.3% when heat-treated under no load at 105° C. for 30 minutes,
(3) having a dimensional change rate in two directions perpendicular to each other in the surface of the film under a load of 0.37 MPa based on the cross section of the film within a temperature range of 30 to 150° C. of not higher than
(4) having a density of not lower than 1.350 g/cm$^3$,
(5) having a total light transmittance of not lower than 87%,
(6) having a haze value of lower than 1.5%, and
(7) having a thickness of 50 to 130 µm,
and a light-diffusing layer formed on one surface of the biaxially oriented polyester film.

PREFERRED EMBODIMENT OF THE INVENTION

Figure 1:
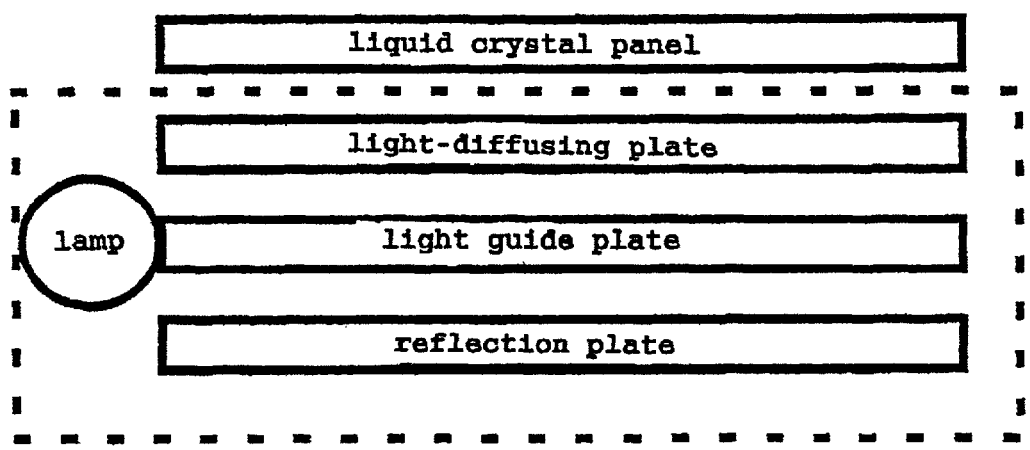
FIG. 1 is a conceptual diagram illustrating a method for measuring the luminance (a) of the biaxially oriented polyester film by means of a light guide plate.

Firstly, the biaxially oriented polyester film of the present invention will be described hereinafter.

Aromatic Polyester

An aromatic polyester constituting the biaxially oriented polyester film of the present invention comprises ethylene-2,6-naphthalene dicarboxylate as a main recurring unit. The ethylene-2,6-naphthalene dicarboxylate unit constitutes more than 50 mol %, preferably at least 80 mol %, more preferably at least 90 mol % based on all recurring units. Recurring units other than the ethylene-2,6-naphthalene dicarboxylate unit can be introduced by using dicarboxylic acids other than 2,6-naphthalenedicarboxylic acid and/or glycols other than ethylene glycol as copolymerizable components.

As the copolymerizable components, compounds having two ester-forming functional groups can be used. Illustrative examples of the copolymerizable components include oxalic acid, adipic acid, phthalic acid, sebacic acid, dodecanedicarboxylic acid, succinic acid, isophthalic acid, 5-sodium sulfoisophthalic acid, terephthalic acid, 2-potassium sulfoterephthalic acid, 2,7-naphthalene dicarboxylic acid, 1,4- cyclohexanedicarboxylic acid, 4,4'-diphenyldicarboxylic acid, phenylindanedicarboxylic acid, diphenyl ether dicarboxylic acid and lower alkyl esters thereof; oxycarboxylic acids such as p-oxyethoxybenzoic acid and lower alkyl esters thereof; propylene glycol, 1,2-propanediol, 1,3-butanediol, 1,4-butanediol, 1,5-pentanediol, 1,6-hexanediol, 1,2-cyclohexanedimethanol, 1,3-cyclohexanedimethanol, 1,4-cyclohexanedimethanol, p-xylylene glycol, an adduct of bisphenol A with ethylene oxide, an adduct of bisphenol S with ethylene oxide, triethylene glycol, polyethylene oxide glycol, polytetramethylene oxide glycol, neopentyl glycol and the like.

Further, the aromatic polyester may have some or all of its terminal hydroxyl groups and/or carboxyl groups blocked by a monofunctional compound such as benzoic acid or methoxypolyalkylene glycol or may be modified by a very small amount of at least tri-functional ester-forming compound such as glycerine or pentaerythritol in such a manner which ensures that a substantially linear polymer can be obtained.

Further, as the aromatic polyester in the present invention, a blend of an aromatic polyester whose main recurring unit is ethylene-2,6-naphthalene dicarboxylate and a small amount, e.g., at most 20 wt %, of polyester other than the aromatic polyester, such as polyethylene terephthalate or polybutylene terephthalate, can be used.

The aromatic polyester in the present invention is preferably produced by using at least one compound selected from the group consisting of a zinc compound, an antimony compound, a titanium compound, a germanium compound and a manganese compound as a polycondensation catalyst. The aromatic polyester in the present invention can be easily prepared as an aromatic polyester having excellent transparency by using the polycondensation catalyst.

In addition, the above aromatic polyester in the present invention may contain such additives as stabilizers, dyes, lubricants, ultraviolet absorbers and flame retardants as desired. For example, it is preferable to incorporate a small amount of inert particles into the aromatic polyester in order to impart slipperiness to the film. Illustrative examples of the inert particles include inorganic particles such as spherical silica, porous silica, calcium carbonate, silica alumina, alumina, titanium dioxide, kaolin clay, barium sulfate and zeolite; and organic particles such as silicone resin particles and crosslinked polystyrene particles. The inert particles may be either natural or synthetic. In the case of the inorganic particles, synthetic particles are preferred to natural particles since the inorganic particles preferably have a uniform particle diameter. The inert particles can be used without particular limitations in terms of crystal form, hardness, specific gravity and color.

The inert particles can be used solely or in combination of two or more.

The average particle diameter of the above inert particles is preferably an 0.05 to 1.5 µm, more preferably 0.1 to 1.0 µm. The content of the inert particles is preferably 0.001 to 0.1 wt %, more preferably 0.003 to 0.01 wt %.

The inert particles may be added at any time as long as they are added before the formation of the polyester film. For example, they may be added at the time of polymerizing the aromatic polyester or may be added to the aromatic polyester at the time of film formation.

The inert particles are preferably spherical silica fine particles, particularly preferably spherical silica fine particles having an average particle diameter of 0.05 to 1.5 µm and a particle diameter ratio (long diameter/short diameter) of 1.0 to 1.2. These spherical silica fine particles each have a spherical form which is extremely close to a complete sphere, and they include few coarse particles and are significantly different from silica fine particles (superfine aggregated particles having a size of about 10 nm or agglomerates (agglomerated particles) having a size of about 0.5 µm of the superfine aggregated particles) which are conventionally known as a lubricant. When the average particle diameter of the spherical silica fine particles is larger than 1.5 µm, cracks are liable to occur around the protrusions formed by the spherical silica fine particles on the polymer film, whereby a haze value is liable to increase disadvantageously. On the other hand, when it is smaller than 0.05 µm, the film has poor slipperiness and becomes difficult to handle. When the amount of the spherical silica fine particles is larger than 0.1 wt %, slipperiness is satisfactory, but the total number of cracks increases, whereby a haze value is liable to increase disadvantageously. On the other hand, when the amount is smaller than 0.001 wt %, the film has poor slipperiness and becomes difficult to handle.

The spherical silica fine particles are not particularly limited in terms of its production method or other factors as long as they satisfy the above requirements. For example, the spherical silica fine particles can be produced by preparing hydrated silica ($Si(OH)_4$) monodisperse spheres from the hydrolysis of ethyl orthosilicate ($Si(OC_2H_5)_4$) and dehydrating the hydrated silica ($Si(OH)_4$) monodisperse spheres to grow the following silica bond three-dimensionally (refer to Japan Chemical Society Journal '81, No. 9, p. 1503).

$$\equiv Si\text{—}O\text{—}Si\equiv \ldots \text{ silica bond}$$

$$Si(OC_2H_5)_4 + 4H_2O \rightarrow Si(OH)_4 + 4C_2H_5OH$$

$$\equiv Si\text{—}OH + HO\text{—}Si\equiv \rightarrow \equiv Si\text{—}O\text{—}Si\equiv + H_2O$$

Heat Shrinkage

The biaxially oriented polyester film for a light-diffusing plate of the present invention has a heat shrinkage in two directions perpendicular to each other, e.g., longitudinal direction (to be sometimes referred to as "MD" hereinafter) and transverse direction (to be sometimes referred to as "TD" hereinafter), in the surface of the film of not higher than 0.3% when heat-treated under no load at 105° C. for 30 minutes. The heat shrinkage at 105° C. is preferably not higher than 0.2% in both longitudinal and transverse directions. It is preferable that the heat shrinkage be within the above range because a diffusing plate using the biaxially oriented polyester film as a base film can maintain good flatness when heat is applied thereto.

Further, the biaxially oriented polyester film for a light-diffusing plate of the present invention has a heat shrinkage in two directions perpendicular to each other, for example, longitudinal direction and transverse direction, in the surface of the film of preferably not higher than 0.5%, particularly preferably not higher than 0.4%, when heat-treated under no load at 150° C. for 30 minutes. It is preferable that the heat shrinkage be within the above range because the diffusing plate can maintain particularly good flatness when heat is applied thereto.

Dimensional Change Rate

The biaxially oriented polyester film for a light-diffusing plate of the present invention has a dimensional change rate in two directions perpendicular to each other in the surface of the film under a load of 0.37 MPa based on the cross section of the film within a temperature range of 30 to 150° C. of not higher than 1.0%, preferably not higher than 0.5%. When the dimensional change rate is within the above range, a light-diffusing plate using the biaxially oriented polyester film as a base film has good thermal dimensional stability.

Further, the biaxially oriented polyester film of the present invention has a dimensional change rate in two directions perpendicular to each other in the surface of the film within a temperature range of 30 to 200° C. of more preferably not higher than 2.0%, particularly preferably not higher than 1.0%.

Density

The biaxially oriented polyester film for a light-diffusing plate of the present invention has a density of not lower than 1.350 g/cm$^3$, preferably 1.350 to 1.365 g/cm$^3$. Further, the lowest density is preferably not lower than 1.355 g/cm$^3$. When the density is within the above range, the film has good thermal dimensional stability and is therefore preferable as a base film for a light-diffusing plate.

Total Light Transmittance

The biaxially oriented polyester film for a light-diffusing plate of the present invention has a total light transmittance of not lower than 87%, preferably not lower than 90%. When the total light transmittance is lower than the value, a light-diffusing plate using the biaxially oriented polyester film of the present invention as a base film has poor luminance. Therefore, the higher the total light transmittance, the better it is, and the total light transmittance is preferably within a range of 87 to 98%.

Haze

The biaxially oriented polyester film for a light-diffusing plate of the present invention has a haze of lower than 1.5%, preferably lower than 1.5% and not lower than 0.2%. The highest haze is preferably lower than 1.0%. When the haze is higher than the value, incident light diffuses in the film, thereby decreasing the amount of outgoing light, so that a light-diffusing plate using the biaxially oriented polyester film of the present invention as a base film has poor light transmittance. Therefore, the lower the haze, the better it is.

Thickness and Thickness Non-uniformity

The biaxially oriented polyester film for a light-diffusing plate of the present invention has a thickness of 50 to 130 μm, preferably 70 to 125 μm. When the thickness is smaller than 50 μm, a light-diffusing plate using the biaxially oriented polyester film lacks stiffness and is difficult to handle disadvantageously. On the other hand, when the thickness is larger than 130 μm, the absorbed amount of light increases due to the thickness, thereby degrading light transmittance disadvantageously.

Further, the film of the present invention has a difference between the largest thickness and the smallest thickness within a length of 100 mm in two directions perpendicular to each other in the surface of the film of preferably not larger than 4.0 μm, more preferably not larger than 3.0 μm.

When the difference is out of the above range, the non-uniformity in the light transmittance of the film is significant, so that the film may fail to exhibit sufficient luminance on a liquid crystal display disadvantageously.

In addition, in the film of the present invention, the largest thickness and the smallest thickness within a length of 100 mm in the two directions perpendicular to each other in the surface of the film have a thickness variation rate defined by the following expression of not higher than 5%.

thickness variation rate (%)={(largest thickness−smallest thickness)/smallest thickness}×100.

Refractive Index

The biaxially oriented polyester film for a light-diffusing plate of the present invention has a ratio of two refractive indices in two directions perpendicular to each other in the surface of the film, for example, a ratio of the refractive index in the longitudinal direction to the refractive index in the transverse direction, of preferably 0.8 to 1.2, more preferably 0.9 to 1.1. When the ratio is out of the above range, the heat shrinkage loses its balance, whereby the film may have poor flatness disadvantageously.

Flyspecks

The biaxially oriented polyester film for a light-diffusing plate of the present invention has preferably 5 or less, particularly preferably 1 or less flyspecks having a diameter of larger than 50 μm per 100 cm$^2$ of the surface of the film. When the number of flyspecks per 100 cm$^2$ is larger than 5, a light-diffusing plate using the biaxially oriented polyester film of the present invention as a base film may have lower luminance disadvantageously. When the flyspecks are caused by foreign matters such as dust contained in raw material chips, the foreign matters can be removed by use of a filter having small openings in the process of melt-extrusion in the production of the film. The openings of the filter are preferably not larger than 40 μm, more preferably not larger than 25 μm.

Coating Layer

The biaxially oriented polyester film for a light-diffusing plate of the present invention may have a surface reflection-inhibiting layer at least one surface, i.e., either one or both of the surfaces of the film. This layer inhibits surface reflection, whereby a light-diffusing plate using the biaxially oriented polyester film as a base film has increased luminance. Meanwhile, the surface reflection-inhibiting layer also improves the adhesion to the light-diffusing plate.

The surface reflection-inhibiting layer comprises at least one water-soluble or water-dispersible resin selected from the group consisting of polyester resins modified by an urethane resin, a polyester resin, an acrylic resin and a vinyl resin.

The urethane resin is a water-soluble or water-dispersible (may be together abbreviated as "aqueous" hereinafter) urethane resin obtained by the reaction of a polyhydroxy compound and a polyisocyanate compound. The urethane resin may contain a chain extender, a crosslinking agent and the like as required.

Illustrative examples of the polyhydroxy compound include polyethers such as polyoxyethylene glycol, polyoxypropylene glycol and polyoxytetramethylene glycol, polyesters such as polyethylene adipate, polyethylene-butylene adipate and polycaprolactone, polycarbonates, acrylic polyols and a castor oil.

Further, illustrative examples of the polyisocyanate compound include tolylene diisocyanate, phenylene diisocyanate, 4,4'-diphenylmethane diisocyanate, hexamethylene diisocyanate, xylylene diisocyanate, 4,4'-dicyclohexylmethane diisocyanate and isophorone diisocyanate.

In addition, illustrative examples of the chain extender or the crosslinking agent include ethylene glycol, propylene glycol, diethylene glycol, trimethylol propane, hydrazine, ethylenediamine, diethylenetriamine, ethylenediamine-sodium acrylate adduct, 4,4'-diaminodiphenylmethane, 4,4'-diaminodicyclohexylmethane and water. At least one compound is selected from these compounds as appropriate for each of the chain extender and the crosslinking agent, and a polyurethane resin can be synthesized by a conventional polycondensation-crosslinking reaction.

The polyester resin used in the surface reflection-inhibiting layer is an aqueous polyester resin obtained by the polymerization of a polycarboxylic acid and a polyhydroxy compound.

Illustrative examples of the polycarboxylic acid include terephthalic acid, isophthalic acid, orthophthalic acid, 4,4'- diphenyldicarboxylic acid, 2,5-naphthalenedicarboxylic acid, 2,6-naphthalenedicarboxylic acid, 1,4-cyclohexanedicarboxylic acid, 2-potassium sulfoterephthalate, 5-sodium sulfoisophthalate, adipic acid, azelaic acid, sebacic acid, dodecanedicarboxylic acid, glutaric acid, succinic acid, trimellitic acid, trimesic acid, trimellitic anhydride, phthalic anhydride, p-hydroxybenzoic acid, trimellitic monopotassium and ester-forming derivatives thereof.

Further, illustrative examples of the polyhydroxy compound include ethylene glycol, 1,2-propylene glycol, 1,3-propylene glycol, 1,4-butanediol, 1,6-hexanediol, 2-methyl-1,5-pentanediol, neopentyl glycol, 1,4-cyclohexanedimethanol, p-xylylene glycol, a bisphenol A-ethylene glycol adduct, a bisphenol A-1,2-propylene glycol adduct, diethylene glycol, triethylene glycol, polyethylene glycol, polypropylene glycol, polytetramethylene glycol, polytetramethylene oxide glycol, dimethylolpropionic acid, glycerine, trimethylolpropane, sodium dimethylol ethyl sulfonate, potassium dimethylolpropionate and ester-forming derivatives thereof.

The polyester resin can be synthesized by subjecting at least one polycarboxylic acid compound and at least one polyhydroxy compound selected as appropriate from the above polycarboxylic acid compounds and polyhydroxy compounds to a conventional polycondensation reaction. Further, the polyester resin can also be used as a composite polymer having polyester components such as a polyester polyurethane obtained by chain-extending a polyester polyol with an isocyanate and an acryl-modified polyester obtained by modifying a polyester polyol with an acrylic resin.

The acrylic resin used in the surface reflection-inhibiting layer is an aqueous acrylic resin obtained by the addition polymerization of an acrylic acid derivative as a main component. An aqueous acrylic resin containing an alkyl acrylate or alkyl methacrylate as a main component is preferred. An aqueous acrylic resin containing the alkyl acrylate or alkyl methacrylate component in an amount of 30 to 90 mol % and a copolymerizable vinyl monomer component having a functional group in an amount of 70 to 10 mol % is preferred.

Illustrative examples of the alkyl groups of the alkyl acrylate and alkyl methacrylate include a methyl group, ethyl group, n-propyl group, isopropyl group, n-butyl group, isobutyl group, t-butyl group, 2-ethylhexyl group, lauryl group, stearyl group and cyclohexyl group.

Illustrative examples of the vinyl monomer which is copolymerizable with the alkyl acrylate or alkyl methacrylate and has a functional group include vinyl monomers containing, as a functional group, a carboxyl group or salts thereof, an acid anhydride group, a sulfonic acid or salts thereof, an amide group or an alkylolated amide group, an amino group (including a substituted amino group) or an alkylolated amino group or salts thereof, a hydroxyl group, an epoxy group or the like. Of these, the carboxyl group or salts thereof, acid anhydride group and epoxy group are particularly preferred. Two or more types of these groups may be contained in the resin.

As the vinyl monomer copolymerizable with the alkyl acrylate or alkyl methacrylate and having functional groups, the following compounds having such functional groups as a reactive functional group, a self-crosslinkable functional group and a hydrophilic group can be used.

Illustrative examples of a compound having a carboxyl group or salts thereof or an acid anhydride group include acrylic acid, methacryl acid, itaconic acid, maleic acid, salts of these carboxylic acids with a metal such as sodium or ammonia, and maleic anhydride.

Illustrative examples of a compound having a sulfonic acid group or salts thereof include vinylsulfonic acid, styrenesulfonic acid, and salts of these sulfonic acids with a metal such as sodium or ammonia.

Illustrative examples of a compound having an amide group or an alkylolated amide group include acrylamide, methacrylamide, N-methylmethacrylamide, methylolated acrylamide, methylolated methacrylamide, ureido vinyl ether, β-ureidoisobutyl vinyl ether and ureidoethyl acrylate.

Illustrative examples of a compound having an amino group or an alkylolated amino group or salts thereof include diethylaminoethyl vinyl ether, 2-aminoethyl vinyl ether, 3-aminopropyl vinyl ether, 2-aminobutyl vinyl ether, dimethylaminoethyl methacrylate, dimethylaminoethyl vinyl ether, compounds obtained by methylolating the amino groups of these compounds, and compounds obtained by quaternizing the amino groups of these compounds with an alkyl halide, dimethyl sulfate, sultone or the like.

Illustrative examples of a compound having a hydroxyl group include β-hydroxyethyl acrylate, β-hydroxyethyl methacrylate, β-hydroxypropyl acrylate, β-hydroxypropyl methacrylate, β-hydroxyethyl vinyl ether, 5-hydroxypentyl vinyl ether, 6-hydroxyhexyl vinyl ether, polyethylene glycol monoacrylate, polyethylene glycol monomethacrylate, polypropylene glycol monoacrylate and polypropylene glycol monomethacrylate.

Illustrative examples of a compound having an epoxy group include glycidyl acrylate and glycidyl methacrylate. Illustrative examples of compounds having other functional groups include vinyl isocyanate and allyl isocyanate.

In addition, illustrative examples of the vinyl monomer compound further include olefins such as ethylene, propylene, methylpentene, butadiene, styrene and α-methylstyrene, vinyl methyl ether, vinyl ethyl ether, vinyltrialkoxysilane, acrylonitrile, methacrylonitrile, vinylidene chloride, vinyl chloride, vinylidene fluoride, ethylene tetrafluoride and vinyl acetate.

The polyester resin modified by the vinyl resin and used in the surface reflection-inhibiting layer can be obtained by reacting an aqueous polyester resin dissolved or dispersed in water with a vinyl component.

Illustrative examples of the components constituting the aqueous polyester resin include the following polybasic acids and ester-forming derivatives thereof and polyols and ester-forming derivatives thereof. Illustrative examples of the polybasic acids include terephthalic acid, isophthalic acid, phthalic acid, phthalic anhydride, 2,6-naphthalenedicarboxylic acid, 1,4-cyclohexanedicarboxylic acid, adipic acid, sebacic acid, trimellitic acid, pyromellitic acid and dimer acid. At least two of these acid components are used to synthesize the copolyester resin. Further, a slight amount of unsaturated polybasic acid components such as maleic acid, itaconic acid and hydroxycarboxylic acids such as p-hydroxybenzoic acid can be used.

Further, illustrative examples of the polyol components include ethylene glycol, 1,4-butanediol, diethylene glycol, dipropylene glycol, 1,6-hexandiol, 1,4-cyclohexanedimethanol, xylene glycol, dimethylol propane, poly(ethyleneoxide)glycol and poly(tetramethyleneoxide) glycol. These can be used in combination of two or more.

In addition, illustrative examples of the vinyl resin component include, but not limited thereto, an alkyl acrylate and an alkyl methacrylate (alkyl groups thereof are exemplified by a methyl group, ethyl group, n-propyl group, isopropyl group, n-butyl group, isobutyl group, t-butyl group, 2-ethylhexyl group and cyclohexyl group); hydroxy-containing monomers such as 2-hydroxyethyl acrylate, 2-hydroxyethyl methacrylate, 2-hydroxypropyl acrylate and 2-hydroxypropyl methacrylate; amido group-containing monomers such as acrylamide, methacrylamide, N-alkylacrylamide, N-alkylmethacrylamide, N,N-dialkylacrylamide, N,N-dialkylmethacrylate (alkyl groups thereof are exemplified by a methyl group, ethyl group, n-propyl group, isopropyl group, n-buthyl group, isobuthyl group, t-buthyl group, 2-ethyl hexyl group and cyclohexyl group), N-alkoxy acrylamide, N-alkoxy methacrylamide, N,N-dialkoxy acrylamide, N,N-dialkoxy methacrylamide (alkoxy groups thereof are exemplified by a methoxy group, ethoxy group, butoxy group and isobutoxy group), N-methylolacrylamide, N-methylolmethacrylamide, N-phenylacrylamide and N-phenylmethacrylamide; epoxy group-containing monomers such as glycidylacrylate, glycidyl methacrylate and allyl glycidyl ether; monomers containing carboxyl groups or salts thereof such as acrylic acid, methacrylic acid, itaconic acid, maleic acid, fumaric acid, crotonic acid, styrenesulfonic acid and salts thereof (sodium salts, potassium salts, ammonium salts, tertiary amine salts and the like); acid anhydride monomers such as maleic anhydride and itaconic anhydride; and monomers such as vinyl isocyanate, allyl isocyanate, styrene, α-methylstyrene, vinyl methyl ether, vinyl ethyl ether, vinyltrialkoxysilane, alkylmaleic acid monoester, alkylfumaric acid monoester, alkylitaconic acid monoester, acrylonitrile, methacrylonitrile, vinylidene chloride, ethylene, propylene, vinyl chloride, vinyl acetate and butadiene. One or more of these monomers can be copolymerized.

To form the above surface reflection-inhibiting layer on the surface of the biaxially oriented polyester film by coating, a coating solution containing the above water-soluble or water dispersible resin as a main solid component can be used. The coating solution may contain an organic solvent in such a slight amount that does not affect the above water-soluble or water-dispersible resin and other additives. The coating solution can be used with a required amount of surfactant such as an anionic surfactant, cationic surfactant or nonionic surfactant contained therein.

The surfactant is preferably a surfactant capable of reducing the surface tension of the aqueous coating solution and promoting wetting to the polyester film. Illustrative examples of the surfactant include polyoxyethylene alkyl phenyl ether, polyoxyethylene fatty acid ester, sorbitan fatty acid ester, glycerine fatty acid ester, fatty acid metallic soaps, alkylsulfates, alkylsulfonates, alkylsulfosuccinates, quaternary ammonium chloride salts, alkylamine hydrochlorides and betaine-based surfactant.

Further, to improve the adhesion (blocking), water resistance, solvent resistance and mechanical strength of the surface reflection-inhibiting layer, a crosslinking agent such as an isocyanate compound, epoxy compound, oxazoline compound, aziridine compound, melamine compound, silane coupling agent, titanium coupling agent or zircoaluminate coupling agent is preferably contained in the surface reflection-inhibiting layer. In addition, when the resin component of the coating layer has a crosslinking reaction point, a reaction initiator such as a peroxide or an amine is preferably contained, or a sensitizer is preferably contained in the photosensitive resin.

Further, to improve the adhesion and slipperiness of the surface reflection-inhibiting layer, inorganic solid particles such as silica, silica sol, alumina, alumina sol, zirconium sol, kaolin, talc, calcium carbonate, calcium phosphate, titanium oxide, barium sulfate, carbon black, molybdenum sulfide and antimony oxide sol and organic solid particles such as a polystyrene, polyethylene, polyamide, polyester, poly-acrylic acid ester, epoxy resin, silicone resin and fluorocarbon resin may be contained in the surface reflection-inhibiting layer.

The average particle diameter of the solid particles is preferably 0.01 to 0.2 μm. Further, they are preferably added in such an amount that 10,000 to 10,000,000 solid particles are present per $mm^2$ of the surface of the film. The presence of the fine particles improves the slipperiness, handling and light transmittance of the film. Although the reason for the improvements is not obvious, it is assumed to be because the fine particles roughen the surface of the film uniformly and finely, thereby inhibiting the surface reflection of incident light. When the particle diameters of the solid particles are larger than 0.2 μm, the surface of the film becomes so rough that the light transmittance decreases and fallen particles soil the process disadvantageously.

Meanwhile, when the average particle diameter is not larger than 0.01 μm, little improvements in the slipperiness and light transmittance are seen disadvantageously. When the solid particles are added in an amount of larger than 10,000,000/$mm^2$, fallen particles soil the process disadvantageously. On the other hand, when the solid particles are added in an amount of smaller than 10,000/$mm^2$, little improvements in the slipperiness and light transmittance are seen disadvantageously. The solid particles to be added may comprise only one component or two or more components.

Further, the surface reflection-inhibiting layer may contain an antifoaming agent, coatability-improving agent, thickener, antistatic agent, organic lubricant, antioxidant, foaming agent, dye, pigment and the like as required.

This coating solution is preferably applied to either one or both of the surfaces of the polyester film before the completion of crystal orientation in the production process of the polyester film. Although the coating solution may be applied independently of the production process of the polyester film, the coating solution is liable to take in dust in this case, and the dust taken in the coating solution becomes defects at the time of printing. Since a clean atmosphere is desirable and a suitable film can be produced at relatively low cost, the coating solution is preferably applied in the production process. In that case, the solid content of the coating solution is generally 0.1 to 30 wt %, more preferably 1 to 10 wt %. The coating solution can be applied in an amount of preferably 0.5 to 50 g per $m^2$ of a running film to obtain a surface reflection-inhibiting layer having a thickness of 50 to 150 nm.

The coating solution can be applied by a known method. For example, roller coating, gravure coating, roller brush coating, spray coating, air-knife coating, impregnation, curtain coating and the like can be used solely or in combination.

Production Method of Biaxially Oriented Polyester Film

The biaxially oriented polyester film of the present invention can be produced, for example, by extruding a polyester through an I die or T die into a molten sheet, quenching the sheet on a cooling drum to obtain an unstretched film and biaxially stretching and heat-setting the unstretched film under such conditions which ensure that the heat shrinkage, dimensional change rate, density, total light transmittance and haze of the obtained biaxially oriented film fall within the ranges of the properties of the film of the present invention. The unstretched film can be stretched by a roller or tenter and may be stretched in the longitudinal and transverse directions simultaneously or sequentially.

The stretch temperature is preferably 100 to 150° C. The stretch ratios in the longitudinal and transverse directions are preferably 1.5 to 5.0 times and 2.5 to 5.0 times, particularly preferably 2.5 to 4.0 times and 2.8 to 4.2 times, respectively. The biaxially oriented film obtained by stretching is heat-set preferably at 170 to 255° C., particularly preferably at 180 to 250° C., for 1 to 100 seconds and preferably further subjected to heat relaxation treatment.

Light-Diffusing Plate

Next, a description will be given to the light-diffusing plate of the present invention.

The light-diffusing plate of the present invention comprises a biaxially oriented polyester film specified by the above requirements (1) to (7) of the biaxially oriented polyester film for a light-diffusing plate of the present invention and a light-diffusing layer formed on one surface of the polyester film.

It is to be understood that what will not be described hereinafter about the above biaxially oriented polyester film as a base film constituting the light-diffusing plate of the present invention is covered by the above description either as it is or after self-evident modification is made on the description by those skilled in the art.

Further, the above light-diffusing layer comprises light-transmittable solid particles and a light-transmittable resin having the solid particles dispersed therein.

Illustrative examples of the light-transmittable solid particles include (i) glass, an acrylic resin, an urethane resin, a vinyl chloride resin and a polycarbonate resin. These can be used solely or in combination of two or more. These solid particles are known as light-gathering beads and preferably have an average particle diameter of 1 to 500 µm.

Meanwhile, as the light-transmittable resin which is a base material having these solid particles dispersed therein, a light-transmittable acrylic resin is preferred. An example of the light-transmittable acrylic resin is a two-liquid-curable acrylic resin using an acrylic resin as a base compound and an isocyanate-based synthetic resin as a curing agent.

The suitable content of the solid particles in the light-diffusing layer is 20 to 90 wt %. When the content is lower than 20 wt %, light is not uniformly dispersed easily, while when it is higher than 90 wt %, adhesion is not easily obtained disadvantageously.

Further, the thickness of the light-diffusing layer is preferably 10 to 20 µm as a base material resin. By this preferable thickness, the adhesion to the biaxially oriented polyester film (base film) and a light-diffusing effect are achieved at desirable levels.

The solid particles can be dispersed into the base material resin by use of a mixing device such as a roll mill, ball mill or blender. Further, the light-diffusing layer can be formed on the base film by using, for example, roller coating, roll coater, spray coating or electrostatic coating as appropriate.

The light-diffusing plate of the present invention is suitably used as a light-diffusing plate for a liquid crystal display.

EXAMPLES

The present invention will be further described with reference to examples hereinafter. However, the present invention shall not be limited to these examples. The characteristic values described in the examples were measured by the following methods. Further, "parts" in the examples indicate "parts by weights". In addition, the "longitudinal direction" of a film indicates the direction in which the film is extruded in its production process, and the "transverse direction" of the film indicates the direction perpendicular to the longitudinal direction in the surface of the film.

(1) Total Light Transmittance

The total light transmittance Tt (%) for visible light of a film sample is measured by use of the HR-100 haze meter manufactured by MURAKAMI COLOR RESEARCH LABORATORY in accordance with the method described in JIS K6714-1958.

(2) Haze

The total light transmittance Tt (%) and scattered light transmittance Td (%) for visible light of a film sample are measured by use of the HR-100 haze meter manufactured by MURAKAMI COLOR RESEARCH LABORATORY in accordance with the method described in JIS K6714-1958, and a haze (Hz %) is calculated from the following expression.

$$Hz = (Td/Tt) \times 100$$

(3) Film Thickness

The thickness of a film is measured by use of the electronic micrometer (model: K-312A) of Anritsu Corporation at a stylus pressure of 30 g.

(4) Film Thickness Non-uniformity

The thickness in the directions (for example, longitudinal direction and transverse direction of a film) perpendicular to each other in the surface of a film is measured for every 100 mm continuously by use of the electronic micrometer (model: K-312A) of Anritsu Corporation at a stylus pressure of 30 g, and thickness non-uniformity is calculated from the following expression.

$$\text{thickness non-uniformity (µm)} = \text{largest thickness (µm)} - \text{smallest thickness (µm)}$$

(5) Heat Shrinkage (105° C.)

Gauge marks are placed on a film at a distance of 100 mm away in the directions (for example, longitudinal direction and transverse direction of a film) perpendicular to each other in the surface of a film. Then, the film is kept in an oven set at 105° C. under no strain (or under no load) for 30 minutes. The distances between the gauge marks before and after the heat treatment are measured, and a heat shrinkage (105° C.) is calculated from the following expression.

$$\text{heat shrinkage (\%)} = ((L_0 - L)/L_0) \times 100$$

$L_0$: distance between gauge marks before heat treatment
$L$: distance between gauge marks after heat treatment (6) Heat Shrinkage (150° C.)

A heat shrinkage (150° C.) is calculated in the same manner as in the above "(5) Heat Shrinkage (105° C.)" except that the temperature of the oven is set at 150° C.

(7) Dimensional Change Rate (from 30° C. to 150° C.)

A temperature-dimensional change curve when the temperature of a film is increased from 30° C. to 150° C. under a load of 0.37 MPa per cross section at a temperature elevation rate of 5° C./min is measured by use of the apparatus for thermomechanical analysis (model: TMA/SS120C) of Seiko Instruments Inc., and a dimensional change rate (from 30° C. to 150° C.) is calculated from the following expression.

$$\text{dimensional change rate (\%)} = |\{(\text{changed dimension}) - (\text{original length})\}/(\text{original length})| \times 100$$

For example, the dimensional change rate in the above temperature range of a film sample having a length of 15 mm, a width of 4 mm and a thickness of 100 µm is determined by use of a quartz holder under a load of 15 g at a temperature elevation rate of 5° C./min.

(8) Dimensional Change Rate (from 30° C. to 200° C.)

A dimensional change rate (from 30° C. to 200° C.) is calculated in the same manner as in the above "(7) Dimensional Change Rate (from 30° C. to 150° C.)" except that the temperature of a film is increased from 30° C. to 200° C. by the apparatus for thermomechanical analysis.

(9) Refractive Index

The refractive index nx in one direction in the surface of a film (for example, refractive index nMD in the longitudinal direction of the film) and the refractive index ny in the direction perpendicular to the above direction (for example, refractive index nTD in the transverse direction of the film) are measured at 23° C. and an RH of 65% by means of an Abbe refractometer using a sodium D line (589 nm) and either methylene iodide or a mixture of methylene iodide and sulfur as a mount solution.

(10) Density

This is measured at 25° C. in accordance with a sink-and-float method by means of a density gradient tube using calcium nitrate aqueous solution.

(11) Flyspecks

The surface of a film is magnified by 50 times by polarized transillumination by use of a universal projector, and flyspecks present in a measurement area of 100 cm$^2$ are observed. After marked, each of the flyspecks is further observed by an optical microscope. Then, equivalent diameters ((largest diameter+smallest diameter)/2) are determined from the cores of the flyspecks and surrounding voids thereof, and those having an equivalent diameter of larger than 50 μm are counted.

(12) Luminance (12-1) Luminance (a) (Measurement of Luminance when a Light Guide Plate is Used)

A light-diffusing plate is prepared by use of a polyester film, and a luminance measuring device whose schematic constitution is shown in FIG. 1 is prepared to evaluate luminance (a). In FIG. 1, a cold-cathode tube (1.6 W) is used as a lamp, a white film (product of Toray Industries, Inc., trade name: Lumirror E60L, 188 μm) is used as a reflection plate, and a film (trade name: Delaglass AD) manufactured by Asahi Kasei Corporation is used as a light guide plate.

The luminance is measured at a viewing angle of ±80° (direction toward the cold-cathode tube is −90°, front side is 0°, and direction opposite to the cold-cathode tube is +90°) on the surface of the light-diffusing plate by use of the lens-type luminance meter BM-7 of TOPCON CORPORATION as a measuring device, and the largest value (cd/cm$^2$) out of the measured luminance values is taken as the luminance (a). Although FIG. 1 shows the reflection plate, light guide plate and light-diffusing plate with spacings therebetween, the luminance, in reality, is measured with these plates closely contacted with one another. Further, the portion in a dotted box excluding the liquid crystal panel in FIG. 1 is used as the luminance measuring device to measure the luminance.

(12-2) Luminance (b) (Measurement of Luminance when a Vertical Cold-Cathode Tube is Used)

Figure 2:
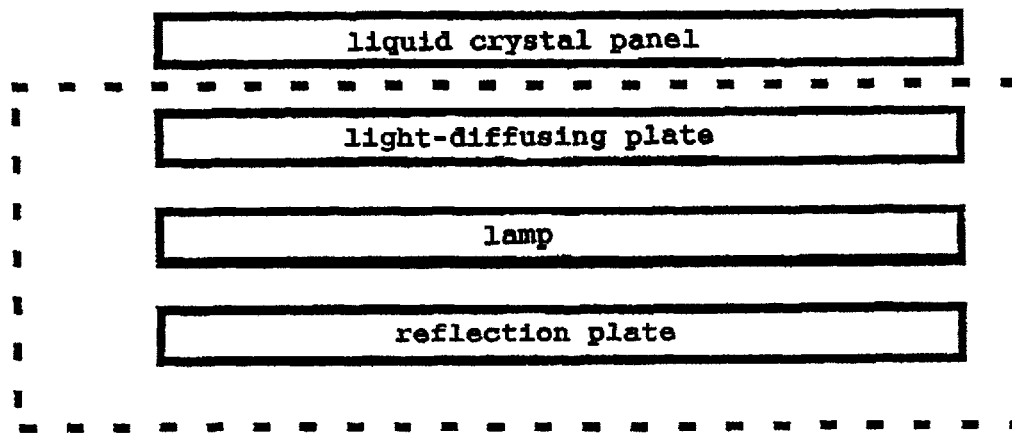
FIG. 2 is a conceptual diagram illustrating a method for measuring the luminance (b) of the biaxially oriented polyester film by means of a vertical cold-cathode tube.

A light-diffusing plate is prepared by use of a polyester film, and a luminance measuring device whose schematic constitution is shown in FIG. 2 is prepared to evaluate luminance (b). In FIG. 2, a cold-cathode tube (3 W) is used as a lamp, and a white film (product of Toray Industries, Inc., trade name: Lumirror E60L, 188 μm) is used as a reflection plate.

The luminance is measured at a viewing angle of ±80° (direction toward the cold-cathode tube is −90°, front side is 0°, and direction opposite to the cold-cathode tube is +90°) on the surface of the light-diffusing plate by use of the lens-type luminance meter BM-7 of TOPCON CORPORATION as a measuring device, and the largest value (cd/cm$^2$) out of the measured luminance values is taken as the luminance (b). Although FIG. 2 shows the reflection plate, lamp and light-diffusing plate with spacings therebetween, the luminance, in reality, is measured with these plates closely contacted with one another. Further, the portion in a dotted box excluding the liquid crystal panel in FIG. 2 is used as the luminance measuring device to measure the luminance.

(13) Overall Evaluation

Overall evaluations are made based on the following criteria.

○ (good): The total of the luminance (a) and the luminance (b) is at least 470 cd/cm$^2$ and thermal dimensional stability (heat shrinkage and temperature dimensional change rate) is excellent.

× (poor): The total of the luminance (a) and the luminance (b) is smaller than 470 cd/cm$^2$ and thermal dimensional stability (heat shrinkage and temperature dimensional change rate) is inferior.

Example 1

100 Parts of naphthalene-2,6-dicarboxylic acid dimethyl and 60 parts of ethylene glycol were subjected to an ester interchange reaction for 120 minutes in the presence of 0.03 parts of manganese acetate tetrahydrate as an ester interchange catalyst while the temperature was gradually increased from 150° C. to 238° C. Then, when the reaction temperature reached 170° C., 0.024 parts of antimony trioxide was added, and 0.004 parts by weight of spherical silica particles having an average particle diameter of 0.5 μm was further added. After the completion of the ester interchange reaction, trimethyl phosphate (solution heat-treated in ethylene glycol at 135° C. for 5 hours under a pressure of 0.11 to 0.16 MPa; 0.023 parts in terms of trimethyl phosphate) was added. Thereafter, the reaction product was charged into a polymerization reactor, heated to 290° C. and then polycondensed under a high vacuum of not higher than 27 Pa to obtain polyethylene-2,6-naphthalate having an intrinsic viscosity measured in an o-chlorophenol solvent at 25° C. of 0.61 dl/g and copolymerized with 1.0 mol % of diethylene glycol (to be sometimes abbreviated as "DEG" hereinafter).

After dried at 170° C. for 6 hours, the pellets of the polyethylene-2,6-naphthalate were supplied to the hopper of an extruder, molten at a melting temperature of 305° C., filtered through a stainless steel small-gauge filter having an average opening of 25 μm, extruded through a 1-mm slit die onto a rotary cooling drum having a surface temperature of 60° C. and quenched to obtain an unstretched film. The thus-obtained unstretched film was preheated at 120° C. and further heated between low-speed and high-speed rollers by means of an IR heater heated at 900° C. and situated 15 mm above the film to stretch the film to 3.0 times in the longitudinal direction. A coating having the following composition 1 was coated on both surfaces of the longitudinally stretched film by a gravure coater in such a manner that the coating film would have a thickness of 0.1 μm when dried.

Then, the resulting stretched film was supplied to a tenter and stretched to 3.1 times in the transverse direction at 145° C. After heat-set at 230° C. for 5 seconds, the obtained biaxially oriented film was relaxed by 0.5% in the transverse direction at 190° C. to obtain a biaxially oriented film having a thickness of 100 μm. After heat-treated, the biaxially oriented film was brought into contact with a cooling roller and quenched with no strain in the transverse direction and a strain in the longitudinal direction. Then, the film was taken up on a roller to obtain a polyethylene-2,6-naphthalate film.

To form a light-diffusing layer on the obtained film, a two-liquid-curable resin was prepared by dispersing 140 parts by weight of acryl beads (product of NIPPON SHOKUBAI CO., LTD., trade name: EPOSTAR YS, particle diameter: 5 to 40 μm) into 100 parts by weight of acryl resin (product of NIPPON CARBIDE INDUSTRIES CO., INC., trade name: RX-1021) which was a base to prepare a main coating and adding 5 parts by weight of isocyanate (product of DAI-ICHI KOGYO SEIYAKU CO., LTD., trade name: C7E37) as a curing agent to 100 parts by weight of the main coating. The resin was coated on the surface of the above polyethylene-2,6-naphthalate film to a thickness of 15 to 25 μm (thickness without the beads) by means of a known MB (comma) roller coating method and dried to prepare a light-diffusing sheet. The properties of the light-diffusing sheet are good as shown in Tables 1 to 3.

The composition of the coating 1 is as follows: acryl resin (product of Nippon Junyaku Co., Ltd., trade name: N31-4): acryl resin comprising 65 mol % of methyl methacrylate, 28 mol % of ethyl acrylate, 2 mol % of 2-hydroxyethylmethacrylate and 5 molt of N-methylolacrylamide (31 wt % in terms of solid content weight), polyester resin (product of Takemoto Oil & Fat Co., Ltd., trade name: TPE series): polyester resin comprising 70 mol % of terephthalic acid, 26 mol % of isophthalic acid and 4 mol % of 5-sodium sulfoisophthalic acid as acid components, and 90 mol % of ethylene glycol and 10 mol % of diethylene glycol as glycol components (61 wt % in terms of solid content weight), spherical silica fine particles (product of Shokubai Kasei Co., Ltd., trade name: SI-80P): spherical silica fine particles having an average particle diameter of 0.08 μm (6 wt % in terms of solid content weight), and wetting agent (product of Sanyo Chemical Industries, Ltd., trade name: SS-70): lauryl polyoxyethylene (2 wt % in terms of solid content weight).

Example 2

A light-diffusing sheet was prepared in the same manner as in Example 1 except that the heat-setting temperature was changed to 240° C. The properties and evaluation results of the film are shown in Tables 1 to 3.

Example 3

A light-diffusing sheet was prepared in the same manner as in Example 1 except that the stretch ratios in the longitudinal and transverse directions were changed to 3.3 times and 3.4 times, respectively, and the heat relaxation after transverse stretching was changed to 1.0%. The properties and evaluation results of the film are shown in Tables 1 to 3.

Example 4

A light-diffusing sheet was prepared in the same manner as in Example 1 except that the thickness of the film was changed to 75 μm. The properties and evaluation results of the film are shown in Tables 1 to 3.

Comparative Example 1

A light-diffusing sheet was prepared in the same manner as in Example 1 except that the stretch ratios in the longitudinal and transverse directions each were changed to 5 times and heat setting was carried out at 210° C. The properties and evaluation results of the film are shown in Tables 1 to 3.

Comparative Example 2

A light-diffusing sheet was prepared in the same manner as in Example 1 except that a nonwoven filter having an average opening of 50 μm was used. The properties and evaluation results of the film are shown in Tables 1 to 3.

Comparative Example 3

A light-diffusing sheet was prepared in the same manner as in Example 1 except that heat setting was carried out at 220° C. The properties and evaluation results of the film are shown in Tables 1 to 3.

Comparative Example 4

A light-diffusing sheet was prepared in the same manner as in Example 1 except that a 0.8-mm slit die was used, the film was heat-set with a strain of 5% in the transverse direction and the heat relaxation at 190° C. was not carried out. The properties and evaluation results of the film are shown in Tables 1 to 3.

Comparative Example 5

0.024 Parts of manganese acetate tetrahydrate was added to a mixture of 100 parts by weight of dimethyl terephthalate and 60 parts of ethylene glycol, and an ester interchange reaction was carried out while the resulting mixture was gradually heated from 150° C. to 240° C. When the reaction temperature reached 170° C., 0.019 parts of antimony trioxide was added, and 0.004 parts by weight of spherical silica particles (NIPPON SHOKUBAI CO., LTD., trade name: SEAHOSTER KE) having an average particle diameter of 0.5 μm was further added. Thereafter, the ester interchange reaction was continued, and after the completion of the ester interchange reaction, a solution (0.018 parts in terms of trimethyl phosphate) obtained by heat-treating trimethyl phosphate in ethylene glycol at 135° C. and a pressure of 0.11 to 0.16 MPa for 5 hours was added. Then, the reaction product was charged into a polymerization reactor, heated to 290° C. and then polycondensed under a high vacuum of not higher than 30 Pa to obtain polyethylene terephthalate.

This polymer was molten at 290° C., filtered through a stainless steel small-gauge filter having an average opening of 25 μm, extruded through a 1-mm slit die into a sheet and brought closely into contact with a water-cooled casting drum at 45° C. to be cooled and solidified, thereby obtaining an unstretched film. The thus-obtained unstretched film was preheated at 90° C. and further heated between low-speed and high-speed rollers by means of an IR heater heated at 800° C. and situated 15 mm above the film to stretch the film to 3.0 times in the longitudinal direction. A coating having the following composition 1 was coated on both surfaces of the longitudinally stretched film by a gravure coater in such a manner that the coating film would have a thickness of 0.1 μm when dried.

Then, the resulting stretched film was supplied to a tenter and stretched to 3.1 times in the transverse direction at 110° C. After heat-set at 220° C. for 5 seconds, the obtained biaxially oriented film was relaxed by 0.5% in the transverse direction at 170° C. to obtain a biaxially oriented film having a thickness of 100 μm. After heat-treated, the biaxially oriented film was brought into contact with a cooling roller and quenched with no strain in the transverse direction and a strain in the longitudinal direction. Then, the film was taken up on a roller to obtain a polyethylene terephthalate film. Further, a light-diffusing film was prepared in the same manner as in Example 1. The properties and evaluation results of the film are shown in Tables 1 to 3.

Comparative Example 6

A light-diffusing sheet was prepared in the same manner as in Comparative Example 5 except that the thickness of the biaxially oriented film was changed to 150 μm. The properties and evaluation results of the film are shown in Tables 1 to 3.

TABLE 3-continued

| | Flyspecks (per 100 cm$^2$) | Luminance (a) (cd/cm$^2$) | Luminance (b) (cd/cm$^2$) | Overall Evaluation |
|---|---|---|---|---|
| C. Ex. 4 | 0 | 200 | 240 | × |
| C. Ex. 5 | 0 | — | — | × |
| C. Ex. 6 | 1 | — | — | × |

Ex.: Example,
C. Ex.: Comparative Example

Effects in the Invention

The polyester film for a light-diffusing plate of the present invention exhibits a small heat shrinkage and a small dimensional change rate when heated and has little foreign matters and thickness non-uniformity. Therefore, it exhibits excellent luminance when used as a film for a light-diffusing plate and can be suitably used particularly for a large display of not smaller than 15 inches.

TABLE 1

| | Main Component | Heat Shrinkage (105° C.) | | Dimensional Change Rate (30 to 150° C.) | | Film Density (g/cm$^3$) | Total Light Transmittance of Film (%) | Haze of Film (%) | Thickness of Film (μm) |
|---|---|---|---|---|---|---|---|---|---|
| | | MD (%) | TD (%) | MD (%) | TD (%) | | | | |
| Ex. 1 | PEN | 0.2 | 0.2 | 0.20 | 0.24 | 1.3560 | 90 | 0.7 | 100 |
| Ex. 2 | PEN | 0.1 | 0.1 | 0.22 | 0.25 | 1.3589 | 89 | 0.8 | 100 |
| Ex. 3 | PEN | 0.1 | 0.1 | 0.25 | 0.26 | 1.3570 | 89 | 0.8 | 100 |
| Ex. 4 | PEN | 0.1 | 0.1 | 0.28 | 0.27 | 1.3575 | 90 | 0.5 | 75 |
| C. Ex. 1 | PEN | 0.5 | 0.5 | 0.34 | 0.35 | 1.3495 | 87 | 0.9 | 100 |
| C. Ex. 2 | PEN | 0.1 | 0.2 | 0.35 | 0.38 | 1.3561 | 85 | 2.0 | 100 |
| C. Ex. 3 | PEN | 0.4 | 0.4 | 0.40 | 0.32 | 1.3497 | 87 | 0.9 | 100 |
| C. Ex. 4 | PEN | 0.3 | 0.3 | 0.39 | 0.35 | 1.3550 | 86 | 1.5 | 100 |
| C. Ex. 5 | PET | 0.5 | 0.4 | 1.05 | 1.15 | 1.3959 | 90 | 0.6 | 100 |
| C. Ex. 6 | PET | 0.5 | 0.5 | 0.59 | 0.61 | 1.3965 | 85 | 2.3 | 150 |

Ex.: Example,
C. Ex.: Comparative Example

TABLE 2

| | Heat Shrinkage (150° C.) | | Dimensional Change Rate (30 to 200° C.) | | Refractive Index | | Refractive Index Ratio | Thickness Non-uniformity of Film | |
|---|---|---|---|---|---|---|---|---|---|
| | MD (%) | TD (%) | MD (%) | TD (%) | MD | TD | | MD (μm) | TD (μm) |
| Ex. 1 | 0.3 | 0.2 | 0.50 | 0.57 | 1.7535 | 1.7573 | 1.00 | 3 | 3 |
| Ex. 2 | 0.3 | 0.2 | 0.43 | 0.54 | 1.7540 | 1.7571 | 1.00 | 3 | 2 |
| Ex. 3 | 0.4 | 0.3 | 0.57 | 0.50 | 1.7555 | 1.7569 | 1.00 | 2 | 2 |
| Ex. 4 | 0.3 | 0.2 | 0.55 | 0.59 | 1.7534 | 1.7573 | 1.00 | 2 | 2 |
| C. Ex. 1 | 0.6 | 0.6 | 0.65 | 0.69 | 1.7705 | 1.7695 | 1.00 | 5 | 4 |
| C. Ex. 2 | 0.3 | 0.3 | 0.64 | 0.78 | 1.7535 | 1.7573 | 1.00 | 3 | 2 |
| C. Ex. 3 | 0.3 | 0.3 | 0.69 | 0.75 | 1.7536 | 1.7573 | 1.00 | 3 | 3 |
| C. Ex. 4 | 0.4 | 0.4 | 0.74 | 0.76 | 1.7535 | 1.7579 | 1.00 | 8 | 6 |
| C. Ex. 5 | 0.8 | 0.7 | 2.24 | 2.45 | 1.6390 | 1.6935 | 0.97 | 3 | 3 |
| C. Ex. 6 | 0.8 | 0.9 | 1.90 | 1.80 | 1.6404 | 1.6980 | 0.97 | 3 | 3 |

Ex.: Example,
C. Ex.: Comparative Example

TABLE 3

| | Flyspecks (per 100 cm$^2$) | Luminance (a) (cd/cm$^2$) | Luminance (b) (cd/cm$^2$) | Overall Evaluation |
|---|---|---|---|---|
| Ex. 1 | 0 | 225 | 270 | ○ |
| Ex. 2 | 0 | 225 | 270 | ○ |
| Ex. 3 | 0 | 230 | 280 | ○ |
| Ex. 4 | 0 | 235 | 285 | ○ |
| C. Ex. 1 | 0 | 205 | 260 | × |
| C. Ex. 2 | 35 | 190 | 230 | × |
| C. Ex. 3 | 0 | 210 | 245 | × |

What is claimed is:

1. A biaxially oriented polyester film for a light-diffusing plate, which film comprises:
   (1) an aromatic polyester whose main recurring unit is ethylene-2,6-naphthalene dicarboxylate, and has
   (2) a heat shrinkage in each of two directions perpendicular to each other along the surface of the film of not higher than 0.3% when heated under no load at 105° for 30 minutes, (3) a dimensional change in each of the two directions perpendicular to each other along the surface of the film, which is measured under a load of 0.37 MPa per the cross section of the film within a temperature range of 30 to 150° C., of not higher than 1.0%, (4) a density of not lower than 1.350 g/cm$^3$, (5) a total light transmittance of not lower than 87%, (6) a haze value of lower than 1.5%, and (7) a thickness of 50 to 130 μm.

2. The film of claim 1, wherein the aromatic polyester contains ethylene-2,6-naphthalene dicarboxylate of at least 80 mol % based on all recurring units.

3. The film of claim 1, wherein the aromatic polyester is obtained by using at least one compound selected from the group consisting of a zinc compound, an antimony compound, a titanium compound, a gemianium compound and a manganese compound as a polycondensation catalyst.

4. The film of claim 1, which has a heat shrinkage in each of two directions perpendicular to each other along the surface of the film of not higher than 0.5% when heat-treated under no load at 150° C. for 30 minutes.

5. The film of claim 1, which has a dimensional change in each of two directions perpendicular to each other in the surface of the film, which is measured under a load of 0.37 MPa per the cross section of the film within a temperature range of 30 to 200° C., of not higher than 2.0%.

6. The film of claim 1, which has a density of 1.350 to 1.365 g/cm$^3$.

7. The film of claim 1, which has a total light transmittance of 87 to 98%.

8. The film of claim 1, which has a haze value of lower than 1.5% and not lower than 0.2%.

9. The film of claim 1, wherein a difference between the a largest thickness and a smallest thickness within a length of 100 mm in each of two directions perpendicular to each other along the surface of the film is not larger than 4.0 μm.

10. The film of claim 1, wherein a largest thickness and a smallest thickness within a length of 100 mm in each of two directions perpendicular to each other along the surface of the film have a thickness variation defined by the following expression of not higher than 5% thickness variation(%)={(largest thickness−smallest thickness)/smallest thickness}×100.

11. The film of claim 1, wherein the ratio of the two refractive indices in the two directions perpendicular to each other along the surface of the film is 0.8 to 1.2.

12. The film of claim 1, wherein up to 5 flyspecks having a diameter of larger than 50 μm can be observed per 100 per cm$^2$ of the surface of the film.

13. The film of claim 1, which further has a surface reflection-inhibiting layer at least one surface of the film.

14. The film of claim 13, wherein the surface reflection-inhibiting layer comprises at least one water-soluble or water-dispersible resin selected from the group consisting of polyester resins modified by an urethane resin, a polyester resin, an acrylic resin and a vinyl resin.

15. The film of claim 13, wherein the surface reflection-inhibiting layer contains solid particles having an average particle diameter of 0.01 to 0.2 μm.

16. The film of claim 13, wherein the surface reflection-inhibiting layer thickness is within a range of 50 to 150 μm.

17. A light-diffusing plate comprising a biaxially oriented polyester film specified by the following requirements (1)~(7):

(1) comprising an aromatic polyester whose main recurring unit is ethylene-2,6-naphthalene dicarboxylate, (2) having a heat shrinkage in each of two directions perpendicular to each other along the surface of the film of not higher than 0.3% when heated under no load at 105° C. for 30 minutes, (3) having a dimensional change in each of two directions perpendicular to each other along the surface of the film, which is measured under a load of 0.37 MPa per the cross section of the film within a temperature range of 30 to 150°C., of not higher than 1.0%, (4) having a density of not lower than 1.350 g/cm$^3$, (5) having a total light transmittance of not lower than 87%, (6) having a haze value of lower than 1.5%, and (7) having a thickness of 50 to 130 μm, and a light-diffusing layer formed on one surface of the biaxially oriented polyester film.

18. The light-diffusing plate of claim 17, wherein the light-diffusing layer comprises (i) light-transmittable solid particles comprising a resin selected from the group consisting of, an acrylic resin, an urethane resin, a vinyl chloride resin and a polycarbonate resin and having an average particle diameter of 1 to 500 μm and (ii) a light-transmittable acrylic resin.

19. A liquid crystal display comprising the light-diffusing plate of claim 17.

* * * * *